(12) United States Patent
Welch et al.

(10) Patent No.: US 9,126,355 B2
(45) Date of Patent: Sep. 8, 2015

(54) COMPOSITE MATERIAL PART MANUFACTURING PROCESS USING REMOVABLE AND RETAINABLE MATERIAL

(75) Inventors: Raymond Curtis Welch, Greenville, NC (US); Muhammad Zia Ullah, Winterville, NC (US); Gregorio Balandran, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 334 days.

(21) Appl. No.: 13/462,376

(22) Filed: May 2, 2012

(65) Prior Publication Data

US 2013/0292861 A1 Nov. 7, 2013

(51) Int. Cl.
*B29C 33/12* (2006.01)
*B29C 33/30* (2006.01)

(52) U.S. Cl.
CPC ............. *B29C 33/12* (2013.01); *B29C 33/308* (2013.01)

(58) Field of Classification Search
CPC ........ B29C 33/12; B29C 51/12; B29C 73/04; B29C 73/10; B29C 22/308
USPC .................. 264/40.1, 258, 36.22, 36.18, 257; 425/466, 468, 403, 393
See application file for complete search history.

(56) References Cited

U.S. PATENT DOCUMENTS

| | | | |
|---|---|---|---|
| 4,783,362 A | 11/1988 | Thornton et al. | |
| 5,248,242 A | 9/1993 | Lallo et al. | |
| 5,292,475 A | 3/1994 | Mead et al. | |
| 5,431,870 A * | 7/1995 | Andre | 264/103 |
| 6,071,460 A * | 6/2000 | Renaudin et al. | 264/314 |
| 6,264,868 B1 * | 7/2001 | Marchant | 264/221 |
| 6,475,320 B1 * | 11/2002 | Masugi | 156/189 |
| 6,524,515 B1 * | 2/2003 | Cavalli | 264/449 |
| 6,638,466 B1 * | 10/2003 | Abbott | 264/238 |
| 6,645,610 B1 | 11/2003 | Reis et al. | |
| 7,413,694 B2 * | 8/2008 | Waldrop et al. | 264/257 |
| 7,638,084 B2 * | 12/2009 | Frankel | 264/512 |
| 8,066,504 B2 * | 11/2011 | Callis et al. | 425/403 |
| 8,778,117 B2 * | 7/2014 | Dorawa et al. | 156/245 |
| 8,889,050 B2 * | 11/2014 | Nitsch | 264/257 |
| 2008/0116618 A1 * | 5/2008 | Martin et al. | 264/480 |
| 2009/0154775 A1 * | 6/2009 | Lea et al. | 382/108 |
| 2009/0239018 A1 | 9/2009 | Aijima | |
| 2009/0297788 A1 | 12/2009 | Dull et al. | |
| 2010/0139857 A1 * | 6/2010 | Pham et al. | 156/286 |
| 2012/0040042 A1 * | 2/2012 | Guitton et al. | 425/468 |

* cited by examiner

*Primary Examiner* — Nahida Sultana
(74) *Attorney, Agent, or Firm* — Hovey Williams LLP

(57) ABSTRACT

A system for changing a dimension of manufactured composite material parts may comprise a male tool, a female tool, a removable material, and a retainable material. The male tool may include a convex outer surface configured to receive composite material placed thereon to form a new part. The female tool may include a concave inner surface configured to receive the male tool such that the outer surface of the male tool faces the inner surface. The removable material may be placed on the composite material in a first area corresponding to a wide area on a previously manufactured part where an outer dimension was measured to be greater than a designed value. The retainable material may be placed on the composite material in a second area corresponding to a narrow area on the previously manufactured part where the outer dimension was measured to be less than the designed value.

20 Claims, 4 Drawing Sheets

COMPOSITE MATERIAL PART MANUFACTURING PROCESS USING REMOVABLE AND RETAINABLE MATERIAL

BACKGROUND OF THE INVENTION

1. Field of the Invention

Embodiments of the present invention relate to composite material part manufacturing processes.

2. Description of the Related Art

Composite materials are increasingly being used to manufacture parts in many industries to reduce the weight of the parts while at the same time increasing the strength of the parts as compared with previously used materials, such as metals. During a composite material part forming process, composite material may be placed or layed up on a male tool, such as a fiber placement mandrel. Laying up composite material on the male tool may form an uncured composite material part. In order to cure the uncured composite material part, the part and the male tool may be placed in a female tool, with the uncured composite material part being positioned between the female tool and the male tool. After the cure, the composite material part may be measured to verify the quality of the part.

The dimensions of the composite material part may not match designed values due to a number of factors, such as portions of the male tool being improperly sized, portions of the female tool being improperly sized, combinations thereof, or other anomalies. Replacing the male tool or the female tool can be prohibitively expensive. In some cases, shims may be used during the assembly of parts to compensate for any anomalies. As a result, correcting the problems associated with improperly sized composite material parts creates extra work and costs extra money and time.

SUMMARY OF THE INVENTION

Embodiments of the present invention solve the above-mentioned problems and provide a distinct advance in the art of composite material part manufacturing. More particularly, embodiments of the invention provide systems and methods for changing a dimension of manufactured composite material parts by utilizing removable and retainable materials.

A system constructed in accordance with an embodiment of the present invention broadly comprises a male tool, a female tool, a removable material, and a retainable material. The male tool may include a convex outer surface configured to receive composite material placed thereon to form a new part. The female tool may include a concave inner surface configured to receive the male tool such that the outer surface of the male tool faces the inner surface of the female tool. The removable material may be placed on the composite material in a first area corresponding to a wide area on a previously manufactured part where an outer dimension was measured to be greater than a designed value such that the removable material faces the inner surface of the female tool. The retainable material may be placed on the composite material in a second area corresponding to a narrow area on the previously manufactured part where the outer dimension was measured to be less than the designed value such that the retainable material faces the inner surface of the female tool.

A method in accordance with another embodiment of the present invention comprises the steps of: measuring an outer dimension of a previously manufactured part formed from composite material that has been cured; determining a wide area of the previously manufactured part where the outer dimension is greater than a designed value; determining a narrow area of the previously manufactured part where the outer dimension is less than the designed value; placing composite material for a new part on an outer surface of a male tool; placing removable material on top of a first area of the composite material corresponding to the wide area of the previously manufactured part; placing retainable material on top of a second area of the composite material corresponding to the narrow area of the previously manufactured part; placing the male tool with the composite material in a female tool such that the removable material and the retainable material face an inner surface of the female tool; curing the composite material, the removable material, and the retainable material; removing the removable material from the new part; and blending the retainable material with the composite material of the new part.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
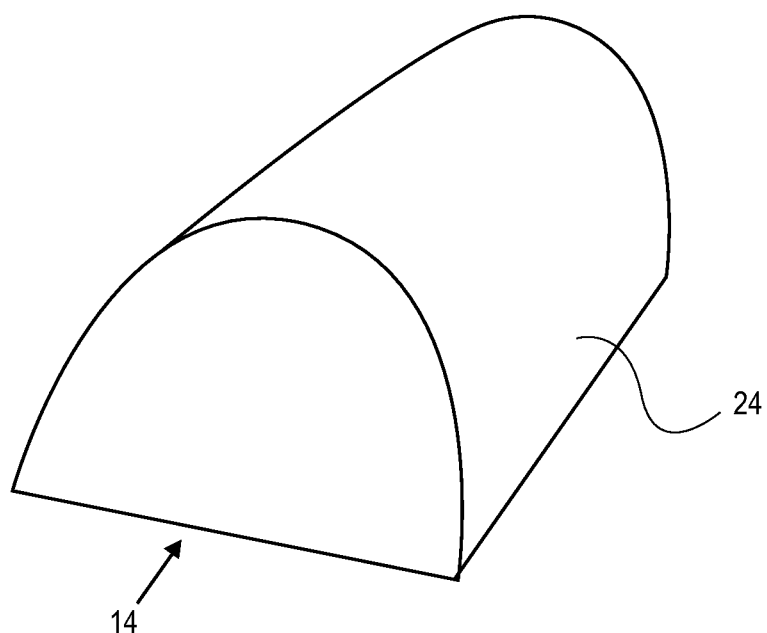
FIG. 1 is a perspective view of a male tool that is part of a system constructed in accordance with various embodiments of the present invention for changing a dimension of manufactured composite material parts.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 5:
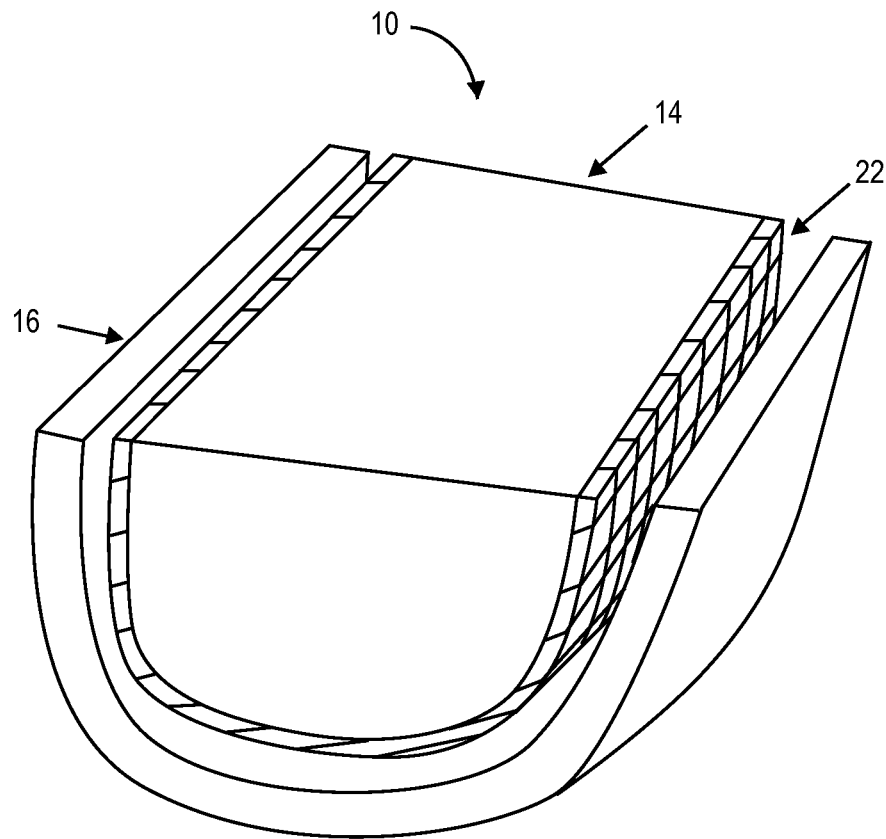
FIG. 5 is a perspective view of the system.

A system 10 constructed in accordance with various embodiments of the present invention for forming composite material parts 12 is shown in FIG. 5 and broadly comprises a male tool 14, a female tool 16, a removable material 18, and a retainable material 20. The composite material part 12 may comprise composite material 22 as is known in the art to include at least two constituent components—a reinforcement material and a matrix material. Examples of the reinforcement material that may be used with the present invention include, but are not limited to, fiber materials such as carbon fiber, boron fiber, fiberglass, aramid fiber, ceramic fiber, and the like. In the case of fiber-based reinforcement materials, the fiber may exist in one of at least two forms—either preimpregnated (prepreg), in which the fiber may be coated with a matrix material that is uncured, such as uncured resin, or unenhanced (dry), with no additives to the fiber. The matrix material may include resins, polymers, epoxies, and the like, among others.

The male tool 14, as shown in FIG. 1, generally forms an interior or concave portion of the composite material part 12. Thus, at least part of the male tool 14 may be shaped to correspond to the inner mold line of the composite material part 12. The male tool 14 may include an outer surface 24 that contacts an inner surface of the composite material part 12. At least a portion of the outer surface 24 may have a convex or outward protruding nonplanar shape. The male tool 14 may be solid or hollow and formed from strengthened materials which can withstand curing heat.

Figure 2:
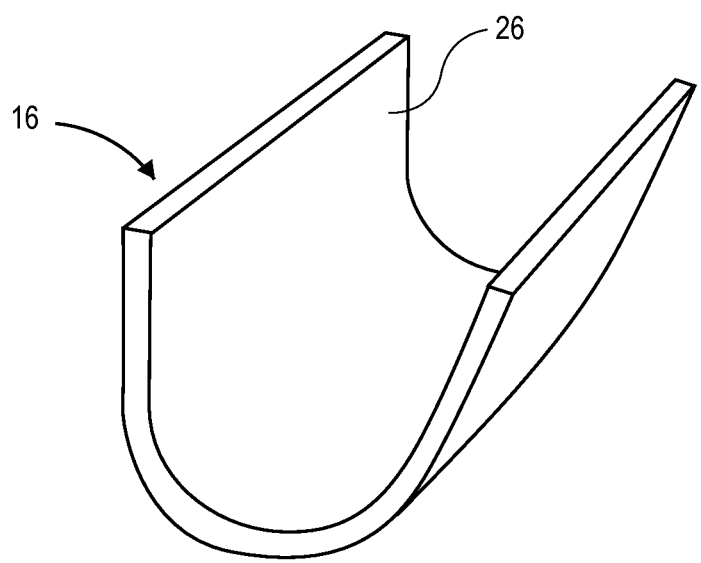
FIG. 2 is a perspective view of a female tool that is part of the system.

The female tool 16, as shown in FIG. 2, generally forms an exterior or convex portion of the composite material part 12. Thus, at least part of the female tool 16 may be shaped to correspond to the outer mold line of the composite material part 12. The female tool 16 may include an inner surface 26 that contacts an outer surface of the composite material part 12. At least a portion of the outer surface may have a concave or inward protruding nonplanar shape. Like the male tool 14, the female tool 16 may be solid or hollow and formed from strengthened materials which can withstand curing heat.

Figure 4:
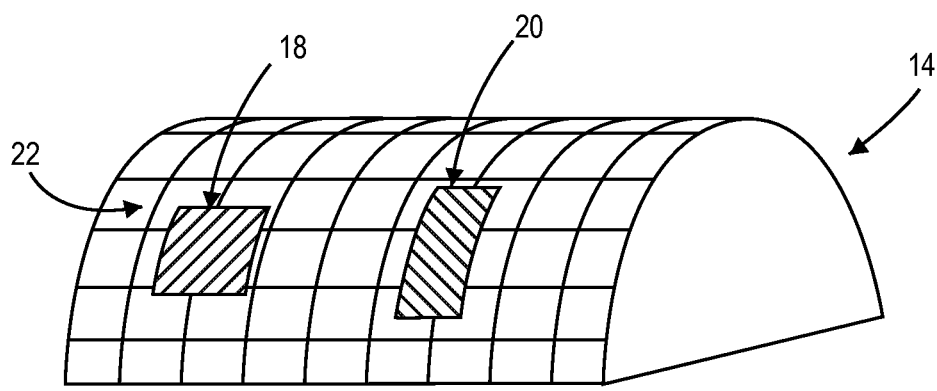
FIG. 4 is a perspective view of the male tool of FIG. 1 with a removable material and a retainable material placed on top of the composite material.

The removable material 18, as shown in FIG. 4, is generally available in sheet form and may include peel ply material such as smooth peel ply, woven peel ply, nylon peel ply, polyester peel ply, and the like, or combinations thereof. The removable material 18 may also be operable to withstand a curing process. The removable material 18 is generally configured to be applied to the composite material 22, cured, and then removed, typically by peeling the removable material 18 from the composite material part 12.

The retainable material 20, as shown in FIG. 4, is also available in sheet form and may include various types of fiberglass or similar materials. The retainable material 20 may also be operable to withstand a curing process. The retainable material 20 is generally configured to be applied to the composite material 22, cured, and then blended with the composite material part 12, which typically includes sanding of the retainable material 20.

The length and width of the removable material 18 and the retainable material 20 may vary according to the size of the composite material part 12. In some situations, either the removable material 18 or the retainable material 20 may be applied to only a portion of the composite material part 12, and thus may have smaller dimensions than the composite material part 12. In other situations, either the removable material 18 or the retainable material 20 may be applied to all of one surface of the composite material part 12 and thus may have similar dimensions to the composite material part 12. The removable material 18 and the retainable material 20 may have a range of thicknesses. In some embodiments, one layer or sheet of the removable material 18 and/or the retainable material 20 may be applied to the composite material part 12. In other embodiments, multiple layers of the removable material 18 and/or the retainable material 20 may be applied in a stack to the composite material part 12.

Many portions of an aircraft, such as the fuselage or the wings, require U-shaped or C-shaped parts. For these types of parts, the surface smoothness and the shape and dimensions of the outer mold line are critical. If the manufactured parts have dimensions that do not match the designed values or if the designed values change, then the system 10 of the current invention may be used to change the dimensions of the manufactured parts. In more detail, the system 10 may be utilized as follows.

Figure 3:
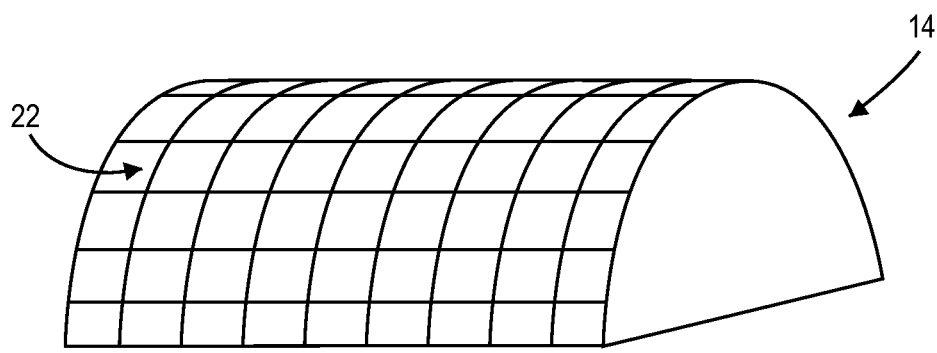
FIG. 3 is a perspective view of the male tool of FIG. 1 with composite material placed on an outer surface of the male tool.

Composite material 22 may be placed or layed up on the outer surface 24 of the male tool 14, as shown in FIG. 3. The composite material 22 may be placed on the male tool 14 manually or automatically by a machine. After placement to achieve the proper thickness and shape, or profile, the composite material 22 may be transferred to the female tool 16, as shown in FIG. 5. The male tool 14 and the composite material 22 placed thereon are positioned such that the outer surface of the composite material 22 faces the inner surface 26 of the female tool 16 with a gap between the two surfaces. The gap may be necessary to accommodate expansion of the composite material 22 during the curing process. The combination of the male tool 14, the composite material 22, and the female tool 16 may be cured under the timing and temperature conditions appropriate for the part. Curing may occur in an oven or an autoclave. After cure, the composite material part 12 may be removed from the male and female tools 14, 16 and measured to verify that the outer dimension (the cross sectional width or the distance from one outer surface to an opposing outer surface) and other features of the composite material part 12 are within tolerance or approximately equal to the designed values. If the measured specifications of the composite material part 12 are within tolerance, then the system 10 is operating within design parameters and does not need to be modified. However, if the measured dimensions are not equal to the designed values, then it is possible that the dimensions of the male tool 14, the female tool 16, or both tools 14, 16 are not equal to the designed values—through usage over time or original manufacturing errors. The use of the removable material 18 and/or the retainable material 20 may correct the errors produced by the tools 14, 16. Furthermore, it is possible that the design requirements for the composite material part 12 were changed after the male and female tools 14, 16 were built. In this case, the measured specifications of the composite material part 12 will always be out of tolerance. For small changes in the design parameters of the composite material part 12, the removable material 18 and/or the retainable material 20 may accommodate the changes.

If the outer dimension of the composite material part 12 is too wide or exceeds the designed value, then the removable material 18 may be placed on top of the outer surface of the composite material 22 while the composite material 22 is on the male tool 14, as shown in FIG. 4. In other words, the removable material 18 may be the outer or top layer of what will become the composite material part 12. One or more sheets of the removable material 18 may be used. Generally, the thickness of the removable material 18 corresponds to the amount by which the finished composite material part 12 was too wide. For example, if the finished composite material part 12 was 0.004 inches too wide, then the thickness of the removable material 18 is 0.004 inches. In some embodiments, one sheet of removable material 18 may be 0.004 inches thick. In other embodiments, multiple sheets of removable material 18 that are thinner than 0.004 inches may be used. Furthermore, the amount by which the finished composite material part 12 is too wide may vary over the surface area. Thus, some areas of the composite material part 12 may require a first thickness of removable material while other areas may require a second thickness or no removable material 18 at all. In any case, removable material 18 may be placed on top of the outer surface of the composite material 22 in the appropriate areas and with the appropriate thickness. The male tool 14 with the composite material 22 and the removable material 18 may be transferred to the female tool 16 as described above, with the gap existing between the inner surface 26 of the female tool 16 and the removable material 18. The combination of the tools 14, 16 and the materials 18, 20 may be cured. After curing, the composite material part 12 may be removed from the tools 14, 16. The removable material 18 may then be removed from the composite material part 12. The outer dimension of the composite material part 12 may be reduced by an amount equal to the thickness of the material that was removed. Thus, the measured dimensions of the composite material part 12 may be equal to the designed values again.

If the outer dimension of the composite material part 12 is too narrow or is less than the designed value, then the retainable material 20 may be placed on top of the outer surface of the composite material 22 while the composite material 22 is on the male tool 14, as shown in FIG. 4. The thickness of the retainable material 20 may be equal to the amount by which the outer profile of the composite material part 12 is too narrow. In addition, different areas of the composite material part 12 may require different thicknesses. Once the composite material 22 and the retainable material 20 have been placed on the male tool 14, the combination of the three may be transferred to the female tool 16. After curing, the composite material part 12 may be removed from the tools 14, 16. The retainable material 20 may be sanded or blended, if necessary, to smooth the surface. Otherwise, the composite material part 12 may now have dimensions that equal the designed values because the thickness of the retainable material 20 added to the composite material part 12 is equivalent to the distance by which the composite failed to meet the outer dimension.

It is possible that the manufactured part has some areas where the outer dimension exceeds the designed value and other areas where the outer dimension is less than the designed value. Thus, it is possible that both the removable material 18 and the retainable material 20 may be used as discussed above. In such a situation, the removable material 18 may be applied to the composite material 22 in areas where the part is too wide, and the retainable material 20 may be applied to the composite material 22 in areas where the part is too narrow, as shown in FIG. 4. After curing, the removable material 18 may be removed, while the retainable material 20 may be blended with the composite material part 12.

Figure 7:
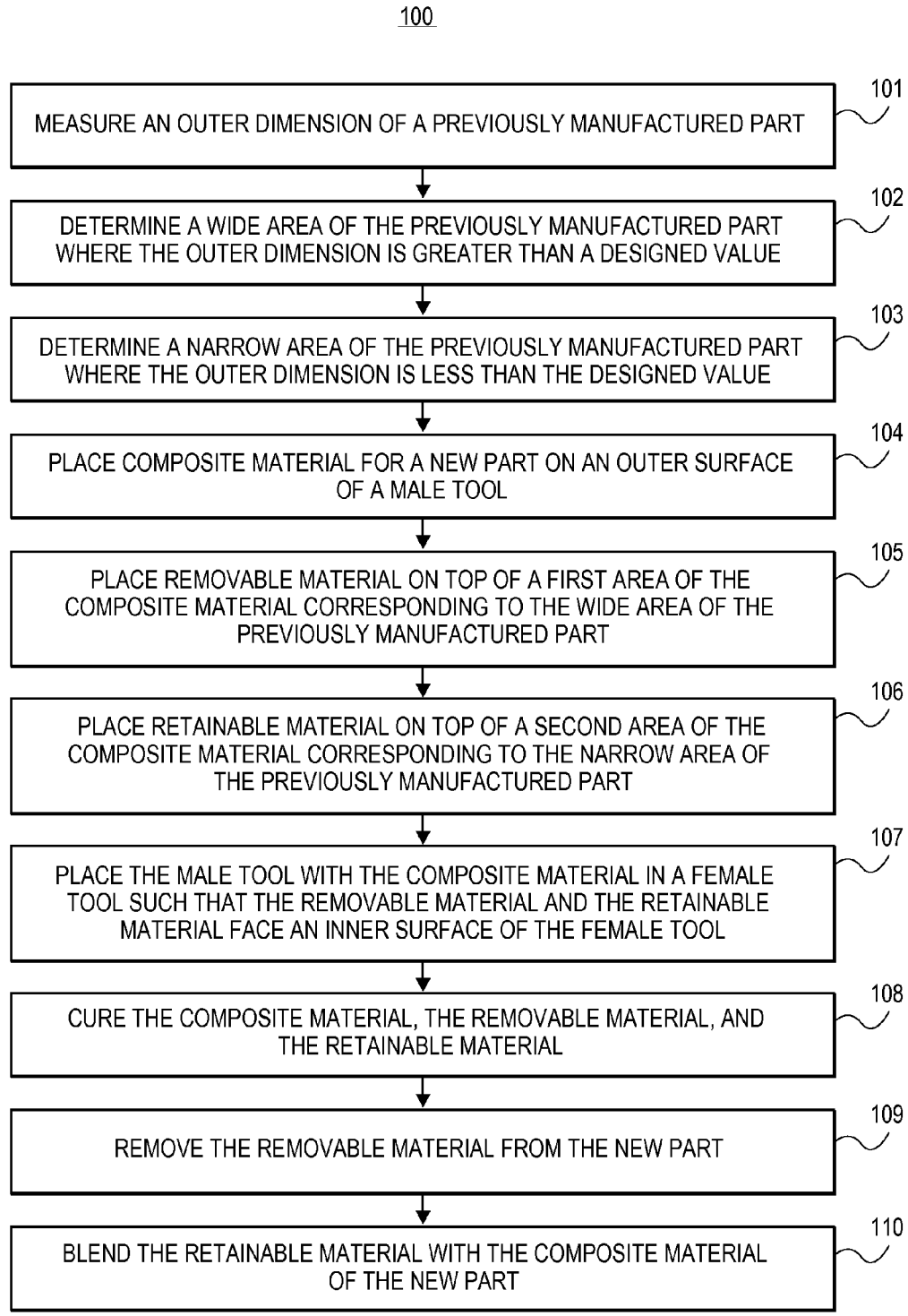
FIG. 7 is a flow diagram of at least a portion of the steps of a method of changing a dimension of manufactured composite material parts.

A method 100 of changing a dimension of manufactured composite material parts 12 using the system 10 in accordance with various embodiments of the present invention is listed in FIG. 7. The steps of the method 100 may be performed in the order as shown in FIG. 7, or they may be performed in a different order. Furthermore, some steps may be performed concurrently as opposed to sequentially. In addition, some steps may not be performed.

Referring to step 101, an outer dimension of a previously manufactured part formed from composite material 22 that has been cured is measured. The outer dimension may be the cross-sectional width of the previously manufactured part.

Referring to step 102, a wide area of the previously manufactured part is determined where the outer dimension is greater than a designed value. The wide area may be a single area on the previously manufactured part or may be multiple areas. The difference between the outer dimension and the designed value may be a single value or it may vary.

Referring to step 103, a narrow area of the previously manufactured part is determined where the outer dimension is less than a designed value. As with the narrow area, the wide area may be a single area on the previously manufactured part or may be multiple areas. The difference between the designed value and the outer dimension may be a single value or it may vary.

Referring to step 104, composite material 22 for a new part is placed on an outer surface 24 of a male tool, as shown in FIG. 3. The composite material 22 may be placed on the male tool by hand or by an automated machine.

Referring to step 105, removable material 18 is placed on top of a first area of the composite material 22 corresponding to the wide area of the previously manufactured part, as shown in FIG. 4. The thickness of the removable material may be equal to the difference between the outer dimension and the designed value.

Referring to step 106, retainable material 20 is placed on top of a second area of the composite material 22 corresponding to the wide area of the previously manufactured part, as shown in FIG. 4. The thickness of the removable material may be equal to the difference between the outer dimension and the designed value.

Referring to step 107, the male tool 14 is placed in a female tool 16 along with the composite material 22 such that the removable material 18 and the retainable material 20 face an inner surface 26 of the female tool 16, as shown in FIG. 5. The male tool 14 may include a convex outer surface 24, and the female tool 16 may include a concave inner surface 26.

Referring to step 108, the composite material 22, the removable material 18, and the retainable material 20 may be cured. Curing may occur in an oven or an autoclave.

Figure 6:
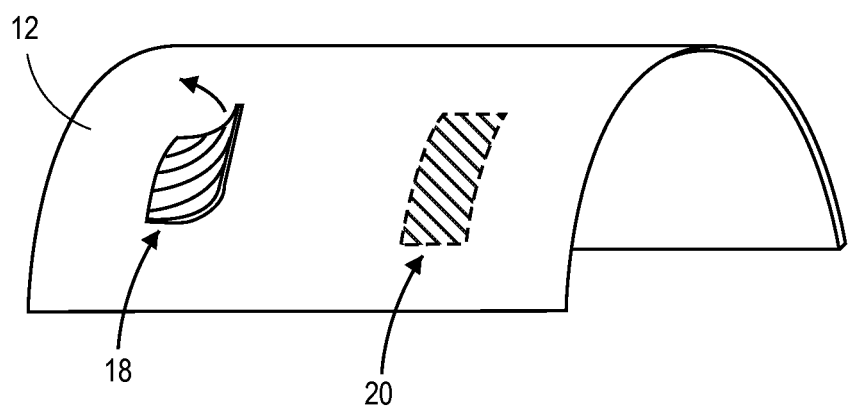
FIG. 6 is a perspective view of a composite material part.

Referring to step 109, the removable material 18 is removed from the new part, as shown in FIG. 6. The new part may be removed from the male tool 14 and the female tool 16, and the removable material 18 may be peeled from the new part.

Referring to step 110, the retainable material 20 is blended with the composite material 22 of the new part, as shown in FIG. 6. The retainable material 20 may be sanded to blend with the composite material 22.

Although the invention has been described with reference to the embodiments illustrated in the attached drawing figures, it is noted that equivalents may be employed and sub-

Having thus described various embodiments of the invention, what is claimed as new and desired to be protected by Letters Patent includes the following:

1. A method of changing a dimension of manufactured composite material parts, the method comprising the steps of:
measuring an outer dimension of a previously manufactured part formed from composite material that has been cured;
determining any one or more wide areas of the previously manufactured part where the outer dimension is greater than a designed value;
determining any one or more narrow areas of the previously manufactured part where the outer dimension is less than the designed value;
placing composite material for a new part to be manufactured on an outer surface of a male tool, wherein the new part to be manufactured is of the same shape as the previously manufactured part;
placing removable material on top of the composite material for the new part to be manufactured in one or more wide target areas corresponding to any one or more determined wide areas of the previously manufactured part to reduce a width of the new part in the one or more wide target areas;
placing retainable material on top of the composite material for the new part to be manufactured in one or more narrow target areas corresponding to any one or more determined narrow areas of the previously manufactured part to increase a width of the new part to be manufactured in the one or more narrow target areas;
placing the male tool with the composite material in a female tool such that the removable material and the retainable material face an inner surface of the female tool;
curing the composite material, the removable material, and the retainable material; and removing the removable material from the new part to be manufactured.

2. The method of claim 1, further comprising the step of blending the retainable material with the composite material of the new part.

3. The method of claim 1, wherein the outer dimension is the cross-sectional width of the previously manufactured part.

4. The method of claim 1, wherein the thickness of the removable material is equal to the outer dimension minus the designed value.

5. The method of claim 1, wherein the thickness of the retainable material is equal to the designed value minus the outer dimension.

6. The method of claim 1, wherein the removable material is one or more sheets of removable material.

7. The method of claim 1, wherein the retainable material is one or more sheets of retainable material.

8. A method of changing a dimension of manufactured composite material parts, the method comprising the steps of:
measuring an outer dimension of a previously manufactured part formed from composite material that has been cured;
determining arty one or more wide areas of the previously manufactured part where the outer dimension is greater than a designed value;
determining any one or more narrow areas of the previously manufactured part where the outer dimension is less than the designed value;
placing composite material for a new part to be manufactured on an outer surface of a male tool, wherein the new part to be manufactured is of the same shape as the previously manufactured part;
placing removable material on top of the composite material for the new part to be manufactured in one or more wide target areas corresponding to any one or more determined wide areas of the previously manufactured part to reduce a width of the new part to be manufactured in the one or more wide target areas;
placing retainable material on top of the composite material for the new part to be manufactured in one or more narrow target areas corresponding to any one or more determined narrow areas of the previously manufactured part to increase a width of the new part to be manufactured in the one or more narrow target areas;
placing the male tool with the composite material in a female tool such that the removable material and any added retainable material face an inner surface of the female tool; curing the composite material, that the removable material, and that the retainable material; removing the removable material from the new part to be manufactured; and blending the retainable material with the composite material of the new part to be manufactured.

9. The method of claim 8, wherein the outer dimension is the cross-sectional width of the previously manufactured part.

10. The method of claim 8, wherein the thickness of the removable material is equal to the outer dimension minus the designed value.

11. The method of claim 8, wherein the thickness of the retainable material is equal to the designed value minus the outer dimension.

12. The method of claim 8, wherein the removable material is one or more sheets of removable material.

13. The method of claim 8, wherein the retainable material is one or more sheets of retainable material.

14. A system for changing a dimension of manufactured composite material parts, the system comprising:
a male tool including a convex outer surface configured to receive composite material placed thereon to form a new part to be manufactured of the same shape as a previously manufactured part;
a female tool including a concave inner surface configured to receive the male tool such that the outer surface of the male tool faces the inner surface of the female tool;
a removable material configured to be placed on the composite material in one or more wide target areas corresponding to one or more wide areas on the previously manufactured part where an outer dimension of the previously manufactured part was measured to be greater than a designed value such that the removable material faces the inner surface of the female tool, wherein the removable material is utilized to reduce a width of the new part in the one or more wide target areas; and
a retainable material configured to be placed on the composite material in one or more narrow target areas corresponding to tory one or more narrow areas on the previously manufactured part where the outer dimension of the previously manufactured part was measured to be less than the designed value such that the retainable material faces the inner surface of the female tool, wherein the retainable material is utilized to increase a width of the new part to be manufactured in the one or more narrow target areas.

15. The system of claim 14, wherein the thickness of the removable material is equal to the outer dimension minus the designed value.

16. The system of claim 14, wherein the thickness of the retainable material is equal to the designed value minus the outer dimension.

17. The system of claim 14, wherein the outer dimension is the cross-sectional width of the previously manufactured part.

18. The system of claim 14, wherein the composite material for the new part is uncured.

19. The method of claim 1, wherein the composite material for the new part is uncured.

20. The method of claim 8, wherein the composite material for the new part is uncured.

* * * * *